US006895356B2

United States Patent
Brimhall et al.

(10) Patent No.: US 6,895,356 B2
(45) Date of Patent: May 17, 2005

(54) INTEGRATED LASER MAPPING TABLET AND METHOD OF USE

(75) Inventors: George Brimhall, Berkeley, CA (US); Mark Rivers, Flossmoor, IL (US)

(73) Assignee: Rubicon Digital Mapping Associates, Berkeley, CA (US)

( * ) Notice: Subject to any disclaimer, the term of this patent is extended or adjusted under 35 U.S.C. 154(b) by 0 days.

(21) Appl. No.: 10/642,057

(22) Filed: Aug. 14, 2003

(65) Prior Publication Data

US 2005/0038627 A1 Feb. 17, 2005

(51) Int. Cl.[7] .......................... G01C 17/00; H04B 7/185
(52) U.S. Cl. ............. 702/150; 342/357.08; 342/357.14; 701/200
(58) Field of Search ................................. 702/150, 151, 702/152, 153, 94, 95; 382/113; 342/357.8, 357.14, 357.17; 172/4.5; 701/200

(56) References Cited

U.S. PATENT DOCUMENTS 5,848,373 A * 12/1998 DeLorme et al. ........... 701/200
6,067,046 A * 5/2000 Nichols .................. 342/357.14
6,480,148 B1 * 11/2002 Wilson et al. ......... 342/357.08

* cited by examiner

Primary Examiner—John Barlow
Assistant Examiner—John Le
(74) Attorney, Agent, or Firm—Michael J. Donohue; Davis Wright Tremaine LLP

(57) ABSTRACT

An integrated digital mapping device contains a personal pen tablet computer (PC), GPS receiver, tilt meter (liquid filled or accelerometer-based), compass and laser range finder integrated into a single housing. The laser range finder is combined with a visible laser to provide convenient aiming. The device also includes a trigger to initiate a measurement cycle. In response to activation of a measurement cycle, the GPS receiver determines the precise location of the measurement device while the other components provide a measurement of tilt angle (up or down inclination pitch), azimuth, and distance an object or area of interest. The roll (left or right sideways tilt) of the tilt meter also provides information when the tablet is aligned with planar objects. The data from a measurement cycle is converted into a predetermined data format for use with the conventional digital mapping software application program operating within the PC.

22 Claims, 11 Drawing Sheets

INTEGRATED LASER MAPPING TABLET AND METHOD OF USE

BACKGROUND OF THE INVENTION

1. Field of the Invention

The present invention is directed generally to digital mapping and data capture in Geographic Information Systems (GIS), and, more particularly, to an integrated digital mapping apparatus and method of use

2. Description of the Related Art

Mapping has traditionally been a laborious manual process. There are many different types of mapping. These range from maps, such as geopolitical maps to topographic maps. Another type of mapping may typically be used in a localized area, such as a geological map of a region, a watershed map, a mine map, or maps that describe natural resources.

Prior to the introduction of computers, mapping was a laborious process requiring hand entry of data and measurements using simple tools, such as surveyor instruments, compasses, tape measures, protractors and the like. With the advent of portable computers, especially pen tablet computers, digital mapping offers the promise of combining high resolution digital maps with sophisticated data entry and retrieval processes. Early digital maps were simply digitizations of existing maps. Thus, digital technology to support office map production had advanced farther than actual digital mapping in the field.

The creation of digital maps in the field requires a number of different instruments. For example, the tape measure of old has been replaced by laser range finding equipment. Similarly, the use of surveyed markers has been replaced to some extent by data provided by a global positioning system (GPS) receiver. A GPS receiver detects satellite signals and can determine position with a high degree of accuracy.

Commercial software packages may be installed in a portable computer to permit mapping and description of data, such as rock formations, natural features, man-made features, and the like, into a digital map. However, the number of pieces of equipment required for data capture in digital mapping are burdensome and difficult to bring into the field. In addition, data collected from surveying equipment must be passed through an interface or manually entered into the portable computer. For example, a GPS receiver may be used to establish key reference points on a digital map. Unless the GPS is interfaced with the computer, the reverence points must be manually entered into the portable computer thus slowing the overall mapping process.

Therefore, it can be appreciated that there is a significant need for a system that integrates various mapping components into a convenient package and allows a high degree of automation of data entry. The present invention provides this and other advantages as will be apparent from the following detailed description and accompanying figures.

BRIEF SUMMARY OF THE INVENTION

The present invention is directed to digital mapping and, in one embodiment, is directed to an integrated digital mapping system comprising a housing sized to be held in the hands of an individual. A portable computer is contained within the housing and has a display visible from the outside of the housing. A tilt meter is positioned within the housing and operably coupled to the computer to provide tilt data indicative of an angular tilt orientation of the housing. A compass is also contained within the housing and operably coupled to the computer to provide compass data indicative of a compass orientation of the housing when selectively activated. A laser is positioned within the housing and operably coupled to the computer to provide range data indicative of a range from the housing to a target when selectively activated. The system also includes an aiming member coupled to the housing to permit aiming of the integrated system at the target and a trigger coupled to the housing to initiate a measurement when activated. The trigger selectively activates the laser to provide range data to the computer and causing the tilt meter and compass to provide tilt data and compass data to the computer.

The system may further comprise a global positioning system (GPS) receiver positioned within the housing and operably coupled to the computer to provide position information indicative of the position of the system when selectively activated.

The aiming member may be an external sight or an aiming laser contained within the housing and configured to generate a visible light when selectively activated.

In one embodiment, the tilt meter and compass may be integrated into a single unit to provide tilt data and compass data to the computer when selectively activated. In one embodiment, the tilt meter provides a measure of the pitch and the roll of the housing.

The system may further comprise a data conversion processor to convert the data into a predetermined format. In one embodiment, the predetermined format is ASCII string data.

The system may be configured for manual activation of the trigger by a user or may be configured for automatic activation. The automatic activation may be at a predetermined rate.

BRIEF DESCRIPTION OF THE SEVERAL VIEWS OF THE DRAWING(S)

DETAILED DESCRIPTION OF THE INVENTION

The present invention is directed to an integrated digital mapping system. A number of separate components are integrated into a single convenient package that allow a high degree of automation in digital mapping. A personal computer (PC) is provided in the form of a pen-tablet computer that allows the user to define selected map features and to set up for automatic data entry. A number of different measurement instruments are integrated into a single housing that also contains the PC. In an exemplary embodiment, the various instruments are triggered by a single source with the result that a plurality of different types of data are collected at the same time and automatically provided to the PC. The data is supplied in various formats that are converted to a single unified format for processing by digital application mapping programs.

Digital mapping, such as described herein, is useful in the area of geographic information systems (GIS). Digital mapping is also useful in surveying, paperless real-time digital mapping in geology above and below ground, in mining, geo-technical mapping, engineering geology, geological engineering, mineral exploration, environmental management and remediation, utilities mapping (e.g., pipelines, fiber optic cables, power lines, and the like), biology, environmental science and engineering, archeology, forensic site investigation, and outdoor and indoor accident site investigation. However, the present invention is not limited to these example applications.

As will be described in greater detail below, the main use of an integrated mapping system, such as described herein, is the direct delineation and three-dimensional data capture of visible features (e.g., points, lines, and areas) by simply pointing a laser at them. Direct data capture is made possible by the effective integration of the PC with other equipment, as will be described in greater detail below.

Figure 1:
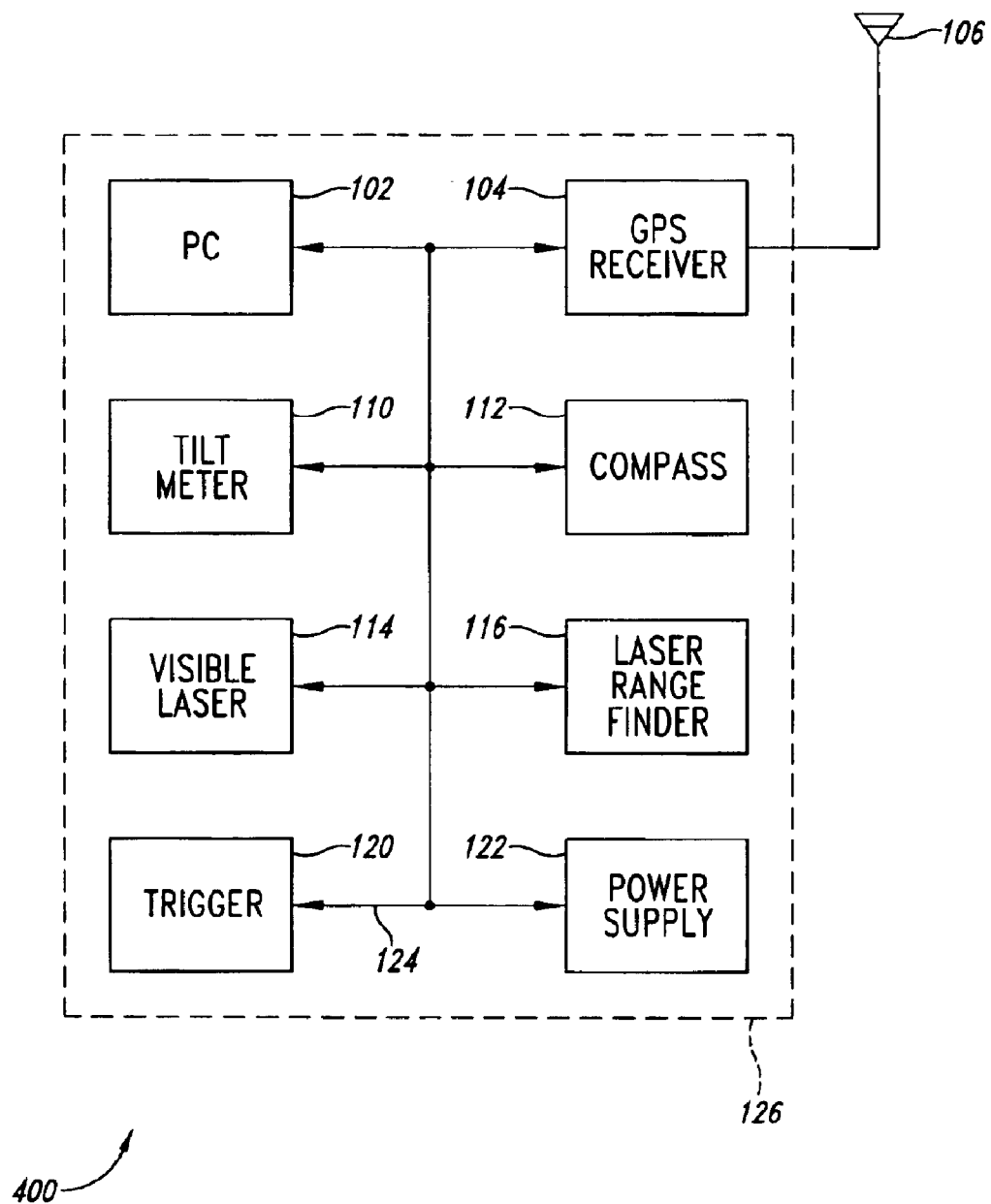
FIG. 1 is a functional block diagram of a system constructed in accordance with the present teachings.

An exemplary embodiment of the invention is illustrated in a system 400, shown in the functional block diagram FIG. 1. The system 400 comprises a PC 102. In an exemplary embodiment, the PC 102 is a pen-tablet PC computer running a conventional operating system, such as Windows® manufactured by the Microsoft Corporation or other conventional operating system. In addition to the conventional operating system, the PC 102 may typically include a digital mapping application program, such as "Pen Map," which is a surveying software program developed in England. In addition, the PC 102 may use a mapping application program known as GeoMapper, which may operate in conjunction with Pen Map. These programs are known in the art and need not be described in great detail herein. However, the advantage of these surveying and mapping programs is that many different types of terrain, geological features, man-made objects, and the like are predefined and readily selected through conventional operation of the PC 102. For example, digital mapping of a geological structure can be readily accomplished by selecting various rock types using the digital mapping application programs on the PC 102.

The system also includes a GPS receiver 104, which is coupled to a GPS antenna 106. Those skilled in the art will appreciate that the GPS receiver 104 provides highly accurate position information when signals are received from a sufficient number of satellites in a constellation of orbiting GPS satellites. The operation of GPS receivers is well known in the art and need not be described in greater detail herein. In one embodiment, the GPS receiver 104 is a differential GPS receiver, which provides great position determining accuracy. Under typical operating conditions, the differential GPS receiver is generally accurate within approximately one meter in absolute Universal Transverse Mercator (UTM) metric coordinates when differentially corrected using wide-area augmentation (WAAS) correction in real time or other sources of differential corrections. In an exemplary embodiment, the GPS receiver 104 is coupled to the PC 102 and provides position information during each measurement cycle or whenever the user moves their location In some applications, the GPS receiver 104 will be unable to provide accurate position information because of obstacles that may block reception of signals from the satellites. For example, steep geological terrain, man-made structures, and the like may effectively block signals from the GPS satellites. In addition, the GPS receiver 104 may not operate effectively when taken inside a building or inside another structure, such as a mine. If GPS information is not available, the system 400 may still be satisfactorily used with known survey markers to accurately establish the current position of the system 400. In an alternative embodiment, relative measurements may be made with respect to the system 400.

The system also includes a tilt meter 110, which provides an indication of the angle of the system 400 as measurements are performed. In an exemplary embodiment, the tilt meter 110 is a liquid-filled digital tilt meter or accelerometer-based sensor that is coupled to the PC 102 and provides data indicating the relative angle of the system 400 in terms of pitch (up and down inclination) and roll (sideways left or right inclination). The use of the tilt meter 110 is described in greater detail below.

The system 400 also includes compass 112. In an exemplary embodiment, the compass 112 is a digital 3-axis magnetometer magnetic compass that is coupled to the PC 102 and provides a compass heading for each measurement.

The system 400 also includes a visible laser 114, which is used for aiming the system 400. In an exemplary embodiment, the visible laser 114 is a visible red laser having a wavelength of approximately 720 nanometers.

The system 400 further includes a laser range finder 116. In an exemplary embodiment, the visible laser 114 and laser range finder 116 may be integrated into a single housing and are calibrated such that a visible light beam 115 from the visible laser 114 aims at the same object as the laser range finder 116. In one embodiment, the laser range finder 116 is a phase-difference laser that is much smaller and less expensive than a pulsed laser, which is sometimes used for range finding.

Pulsed lasers are commercially available with integrated tilt meter and compass, but are large, unwieldy, and expensive. The system 400 incorporates a lower cost phase difference laser range finder 116 and integrated visible laser 114. No commercial product includes such a low-cost laser with integrated tilt meter and compass. Use of a phase-difference laser range finder without a directional sensor, such as the tilt meter 110 and the compass 112 is useless in digital mapping systems.

The operation of the laser range finder 116 is known in the art and need not be described in great detail herein. However, the advantage of the laser range finder is that it is a reflectorless range finding system. That is, the laser range finder 116 does not require a reflective device, such as a mirror, at the distant location to be measured. Rather, the reflectorless range finding system relies on scattering of the incident laser beam wherein a portion of the incident beam is reflected back to the laser range finder 116. The phase-difference laser range finder 116 measures the phase difference between an outgoing signal and an incoming signal reflected from the distant object. Although reflectorless range finding systems have a more limited range than pulsed lasers, the laser range finder 116 operates satisfactorily up to a distance of 35 meters on most rocks and may exceed 50 meters on lighter-colored objects.

The system 400 further includes a trigger 120, which may be implemented simply by push-button switch. In operation, the user aims the system 400 at the object to be measured and presses the trigger 120. In response to activation of the trigger 120, the red pointing laser (i.e., the visible laser 114) is activated. Upon depressing the trigger 120 again, the laser range finder 116 computes the range. The system 400 collects data from the various measurement components and supplies all data to the PC 102. That is, the second activation of the trigger 120 causes the tilt meter 110 and compass 112 to automatically provide digital data indicating the orientation of the system 400 to the PC 102. At the same time, the visible laser 114 has been aimed at the target of interest and, in response to activation of the trigger 120, the laser range finder 116 determines the range from the present location of the system 400 to the selected target and automatically provides range data to the PC 102. Thus, the system 400 automatically provides the plurality of different forms of data to the PC 102 to simplify the digital mapping process. The digital mapping process with the system 400 is hence visual not manual as delineation of targets is done with the visible laser 114.

The various components described above are connected to a power supply 122. The power supply may be a single power supply to provide various operational voltages to the measurement components described above. Alternatively, the various components may have internal power supplies. For example, the PC 102 may typically have its own internal batteries. In an alternative embodiment, the system 400 may have an external power source, such as batteries, that permit the power supply 122 to generate the necessary voltages to operate the system 400.

The various components described above are coupled together by an Input/Output (I/O) bus system 124. The I/O bus system 124 may provide power as well as data. The data may be in the form of controls that trigger or activate measurement cycles for the various components. In addition, the data on the I/O bus system 124 may comprise measurement data provided by the various components to the PC 102.

Those skilled in the art will appreciate that, in one embodiment, the I/O bus system 124 may comprise a plurality of cables coupling various measurement components to different connectors 164a–164d (see FIG. 2) on the PC 102. However, for the sake of clarity, the various connector cables are shown in FIG. 1 as the I/O bus system 124.

The various components are contained in a housing 126, which may be seen in FIGS. 3–8. The housing 126 is designed for operation by a single person and permits easy access to the PC 102. In an exemplary embodiment, the housing 126 is approximately 8¾ inches by 15½ inches and the entire system 400 weighs approximately 6½ pounds (not including the tripod 172). The weight of the PC 102 alone is approximately 3½ pounds.

Figure 2:
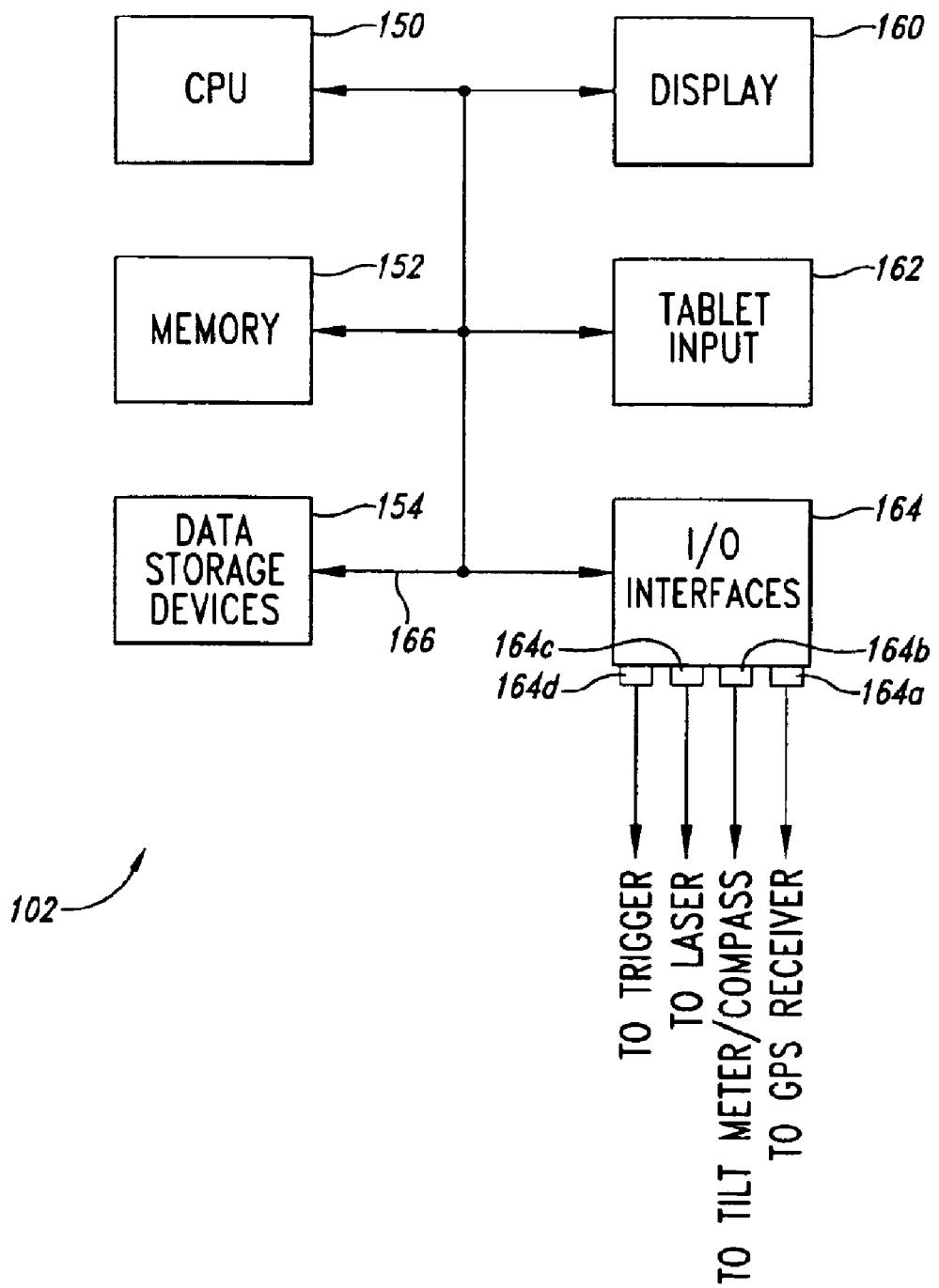
FIG. 2 is a functional block diagram of the PC of FIG. 1.

FIG. 2 is a more detailed functional block diagram of the PC 102. The PC 102 includes a central processing unit (CPU) 150. The CPU 150 may be implemented by any known technology, such as a microprocessor, microcontroller, application-specific integrated circuit (ASIC), digital signal processor (DSP), or the like. The present invention is not limited by the specific hardware component(s) used to implement the CPU 150.

Also included in the PC 102 is a memory 152, which stores instructions and data for execution by the CPU 150. The memory 152 may also be implemented by a variety of known devices and may include, by way of example, random access memory (RAM), read-only memory (ROM), and the like. The present invention is not limited by the specific hardware component(s) used to implement the memory 152.

The PC 102 also includes data storage devices 154. Those skilled in the art will appreciate the variety of data storage devices are presently available for use in the PC 102. These include, without limitation, floppy disk drives, hard disk drives, and optical storage devices (e.g., CD-ROM, R/W CD-ROM, DVD, and the like). The PC 102 may include one or more of these data storage devices. In a typical embodiment, one of the data storage devices 154, such as a hard disk drive, contain the operating system and application programs. Upon power up, the CPU 150 executes certain instructions stored in the memory 152 to load the operating system. In an exemplary embodiment, the PC 102 is set up as a "turn-key" device which automatically starts the operating system and the mapping application program software when the system 400 is turned on by the user.

The PC 102 also includes a display 160, which is typically a color liquid crystal display. In an exemplary embodiment, the PC 102 is implemented as a pen-tablet computer in which the display 160 also includes a tablet input device 162. Although the PC 102 may be satisfactorily implemented using a conventional laptop PC, the advantage of the pen-tablet PC is its rugged durability in a hostile outdoor environment where the system 400 might typically be utilized. The pen-tablet PC 102 is sealed and has no keyboard to permit entry of dust or other contaminants. The user operates the PC 102 by activating the tablet input device 162, which is overlaid on the display 160. The user may enter data or commands using a plastic "pen" to tap on the tablet input device 162 over the selected command on the display 160. Operation of the tablet input device 162 in conjunction with the display 160 is known in the art and need not be described in greater detail herein.

The PC 102 also includes a plurality of I/O interfaces 164 to interconnect the PC 102 with other measurement devices, such as the GPS receiver 104 (see FIG. 1), the tilt meter 110 and compass 112, the visible laser 114 and laser range finder 116, and the trigger 120. The I/O interfaces 164 may comprise a number of known standard interfaces, such as a serial interface (e.g., RS-232, RS-432, and the like), an IEEE-488 interface, a universal serial bus (USB) interface, a parallel interface, and the like. The particular type of interface is selected based on the interfaces required by the various measurement components. For example, one embodiment of the GPS receiver 104 utilizes a 9-pin serial port. Thus, the I/O interfaces 164 include a connector 164a compatible for operation with the GPS receiver 104. Similarly, the I/O interfaces 164 include a connector 164b compatible for operation with the tilt meter 110 and compass 112. The I/O interfaces 164 also include a connector 164c compatible for operation with the visible laser 114 and laser range finder 116. The I/O interfaces 164 also include connector 164d suitable for interface with the trigger 120.

The various components of FIG. 2 may be coupled together by an internal bus system 166. The internal bus system may comprise a data bus, control bus, power bus, I/O bus, and the like. However, for the sake of clarity, the various buses are illustrated in FIG. 2 as the internal bus system 166.

Figure 3:
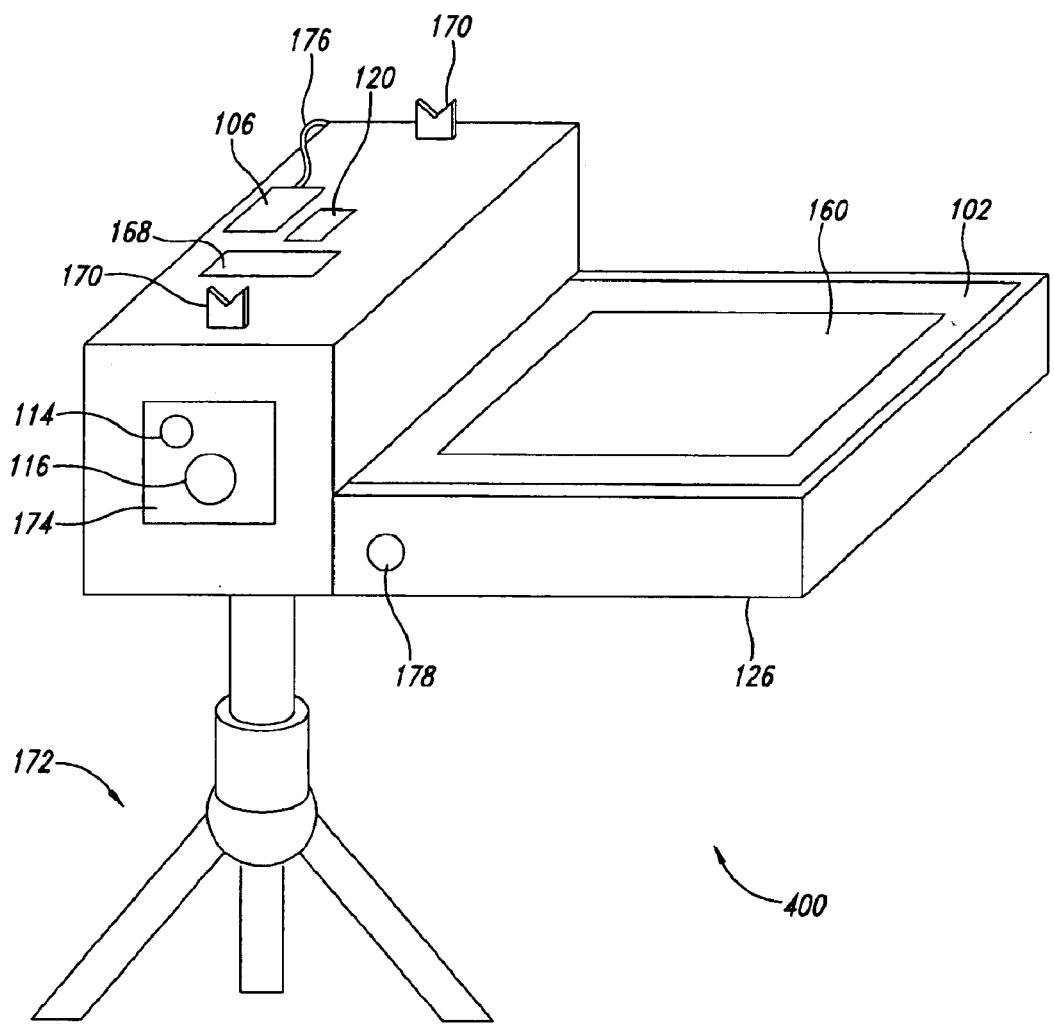
FIG. 3 is a front perspective view of the system of FIG. 1 as mounted on a tripod.

FIG. 3 is a front perspective view of the system 400 as mounted on a tripod 172. However, the system 400 is small enough and light enough to be hand-held and operated by a single user. The visible laser 114 and laser range finder 116 are mounted behind a lens or bezel 174 within the housing 126. Also illustrated in FIG. 3 is an external aiming sight 170 that may be used alone or in conjunction with the visible laser 114 for aiming the system 400. The aiming sight 170 may be a telescopic sight.

In the embodiment illustrated in FIG. 3, the Laser ON trigger 120 is mounted on top of the housing 126 for convenient operation by the user using their thumb. In the embodiment illustrated in FIG. 3, the trigger 120 is a mechanical switch, such as a microswitch, that can be easily activated by the user.

The GPS antenna 106 is illustrated in FIG. 3 as mounted to the housing 126. The GPS antenna 106 may be held in place by an adhesive or material such as Velcro™. The GPS antenna 106 is coupled to the connector 184 (see FIG. 4) by a cable 176. Alternatively, the GPS antenna 106 may be mounted on the user's shoulder or helmet to allow better reception of signals from the GPS satellites.

FIG. 3 also illustrates a digital range display 168, which provides a visual display range as measured the laser range finder 116. A power switch 178 is also mounted in the housing 126 to turn the power on and off to the PC 102.

Figure 4:
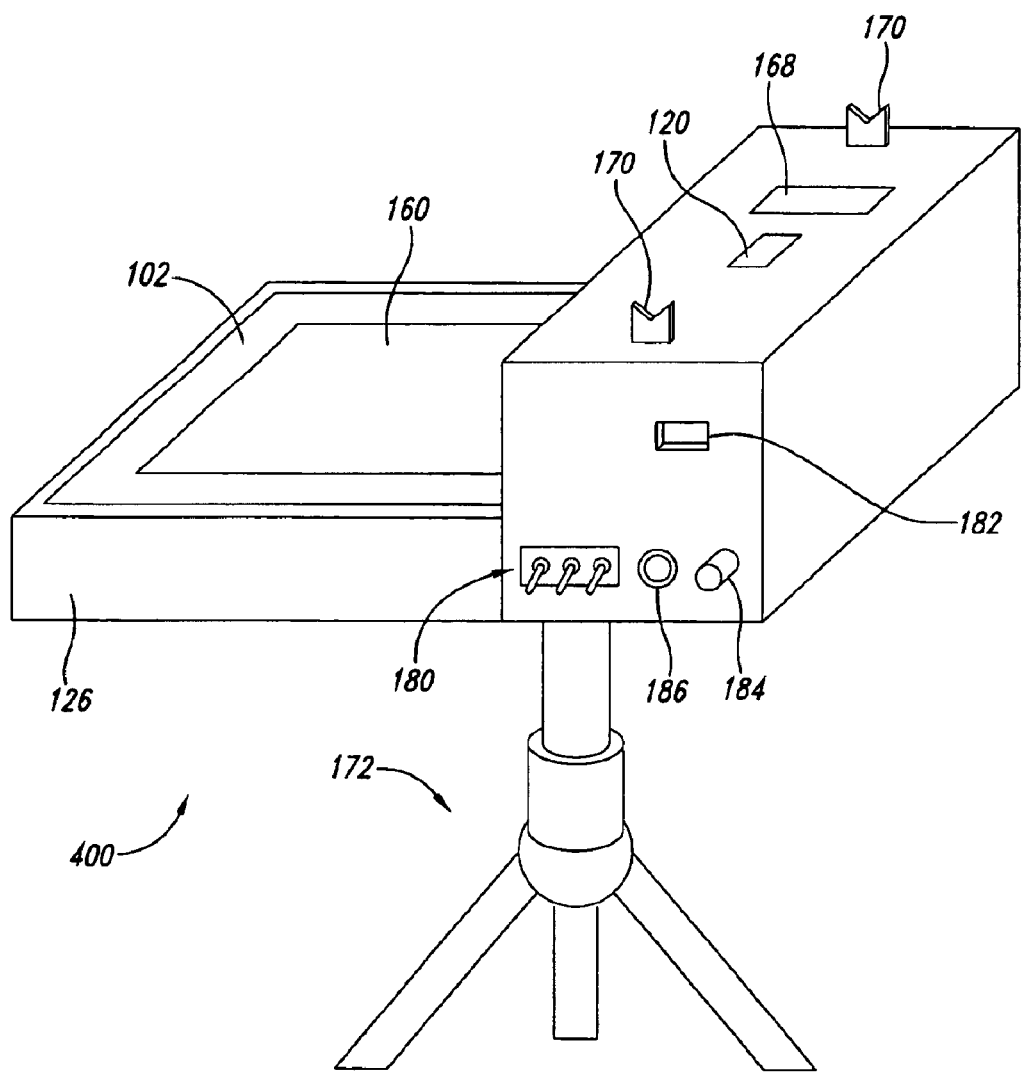
FIG. 4 is a rear perspective view of the inventive system as mounted on a tripod.

FIG. 4 is a rear perspective view illustrating the system 400 as mounted on the tripod 172. As seen in FIG. 4, additional control switches 180 are provided to select options or to provide on-off power switches for components of the system 400, such as the GPS receiver 104.

In addition, the system 400 includes a data port 182, such as a serial port, to permit digital map data to be transferred from the system 400 to an external computer or other device, such as a printer. Those skilled in the art will recognize that other ports, such as a USB port may also be used to implement the data port 182.

The system 400 also includes additional connectors, such as a GPS antenna connector 184 for connection of the GPS antenna 106 (see FIG. 1) and an external power connector if an external power source is used in conjunction with the power supply 122.

Figure 5:
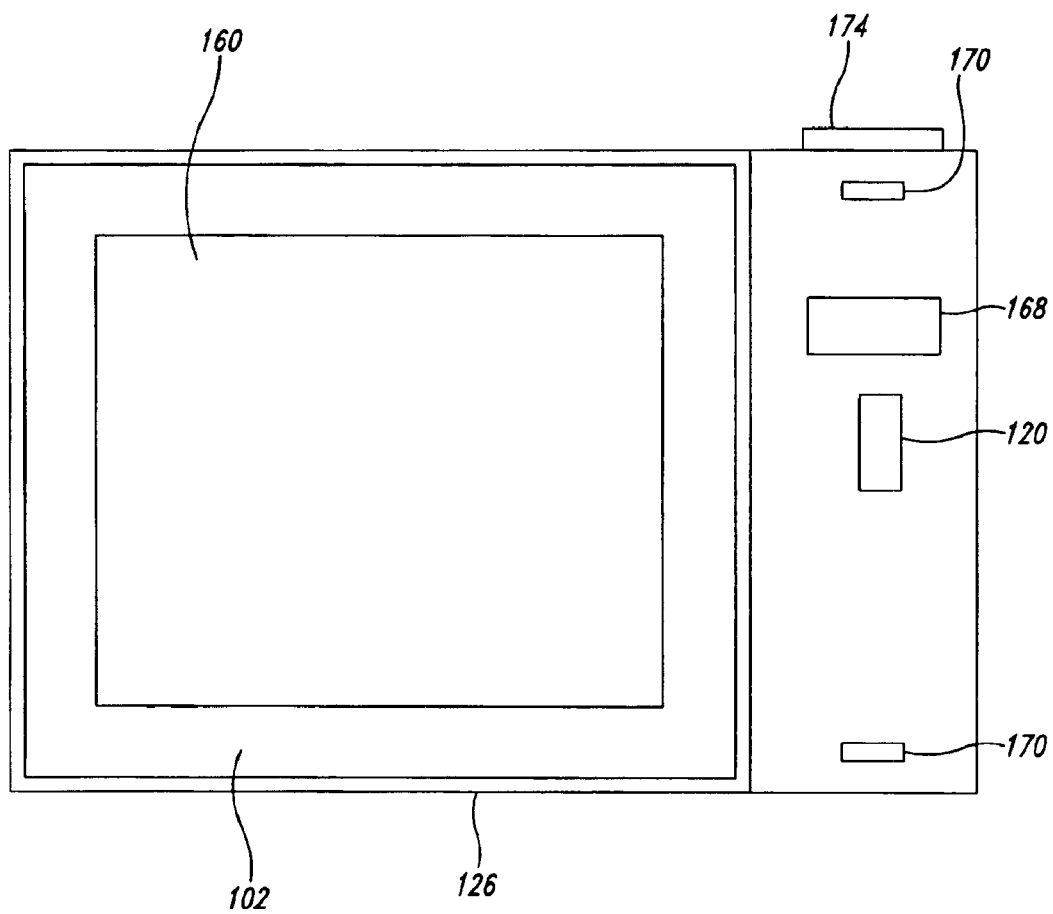
FIG. 5 is a top plan view of the system of FIG. 1.

FIG. 5 is a top plan view of the housing 126 and illustrates the display 160 of the PC 102. The distance value is shown in range display 168. The Laser ON trigger 120, when pressed once, starts the visible laser 114. Then when the Laser ON trigger 120 is depressed a second time, the system 400 captures the data for the point at which the visible laser 114 was directed.

Figure 6:
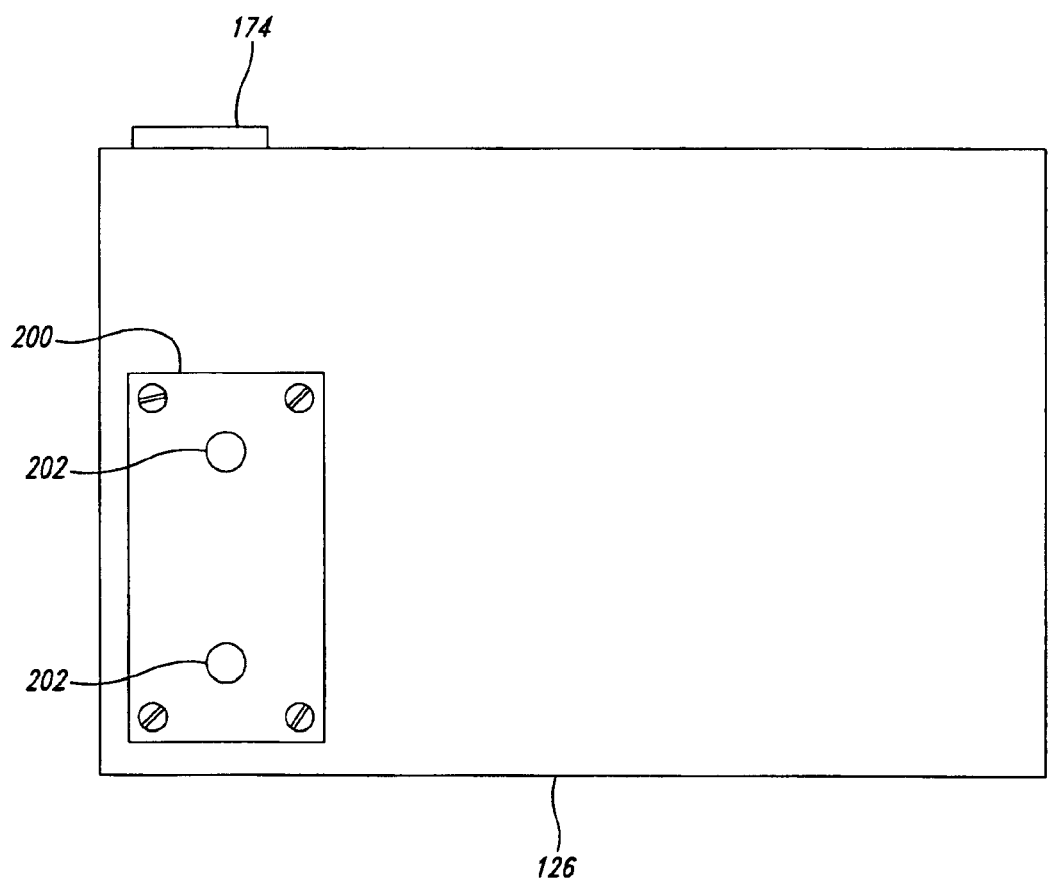
FIG. 6 is a bottom plan view of the system of FIG. 1.

FIG. 6 is a bottom plan view of the housing 126. A mounting plate 200 is attached to the bottom of the housing 126 to permit tripod mounting of the system 400. In an exemplary embodiment, the mounting plate 200 is a 3/16 inch aluminum mounting plate affixed to the bottom of the housing 126 by four machine screws. The mounting plate 200 contains threaded apertures 202 sized to receive a threaded rod (not shown) on the tripod 172 (see FIGS. 2–3). The housing 100 is attached to the tripod 172 in a conventional manner similar to mounting of a camera on a tripod.

Figure 7:
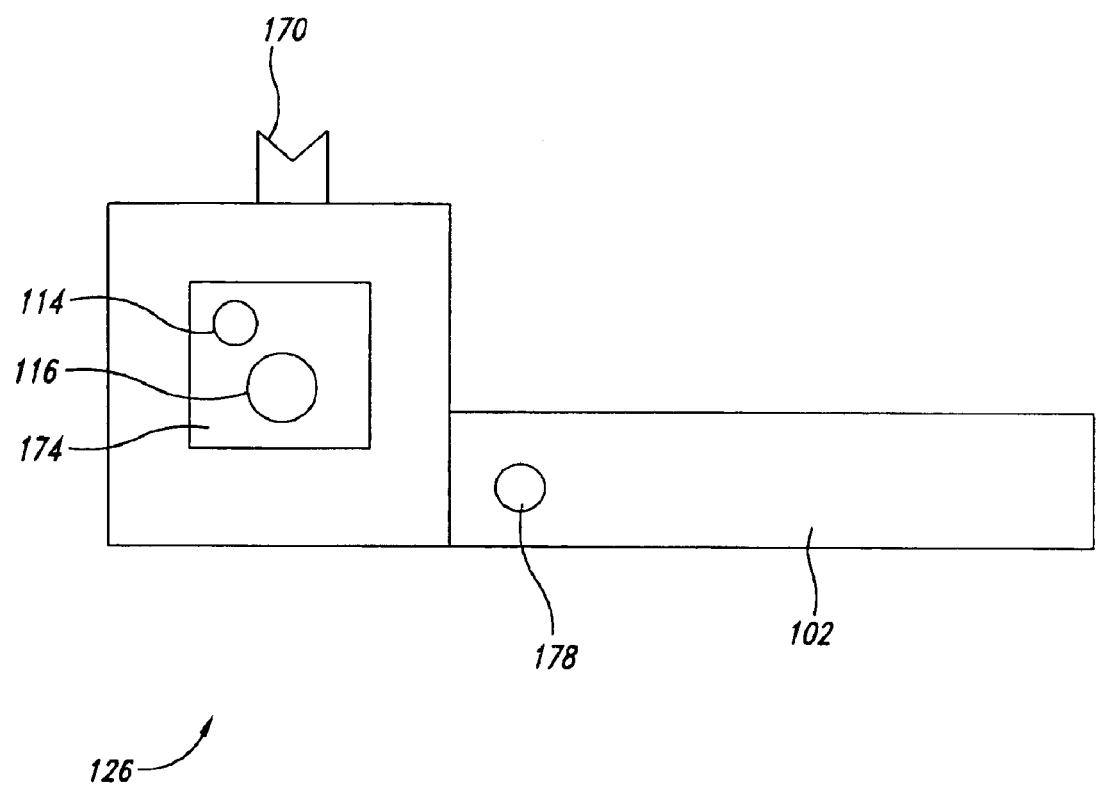
FIG. 7 is a front elevation view of the system of FIG. 1.

FIG. 7 is a front elevation view of the housing 126 and illustrates the positioning of the visible laser 114 and the laser rangefinder 116 within the housing 126.

Figure 8:
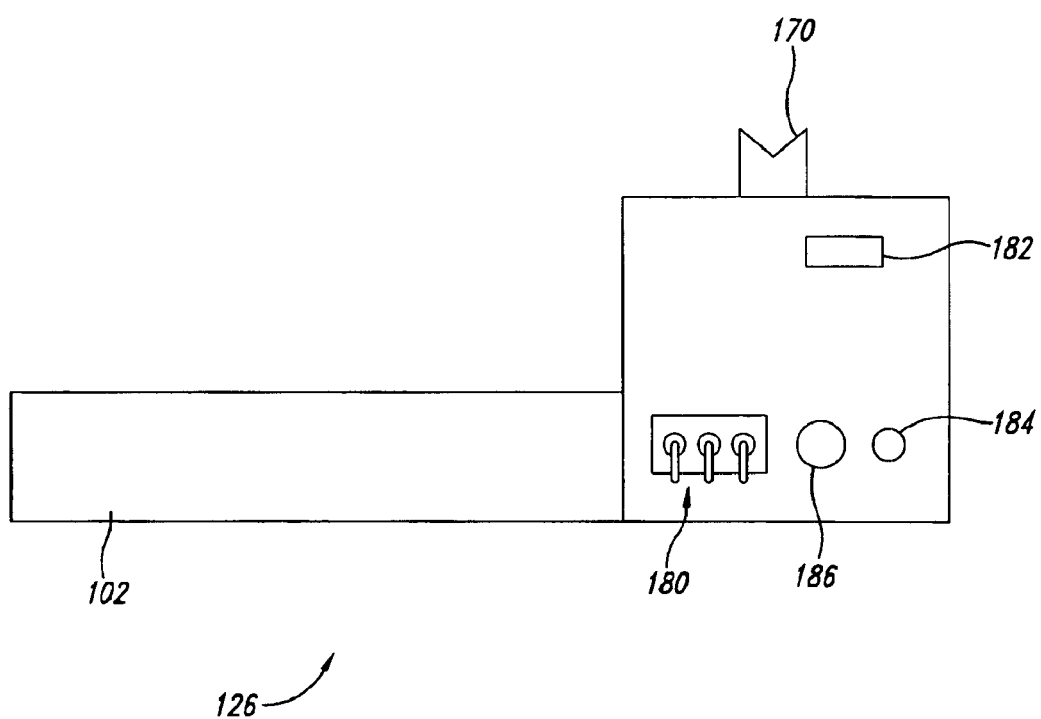
FIG. 8 is a rear elevation view of the system of FIG. 1.

FIG. 8 is a rear elevation view of the housing 126 illustrating the control switches 180 and the data port 182. As previously discussed, the control switches 180 may provide power to the various components or may be used to control operational settings of the various components while the data port 182 may be a serial port, USB port, or other conventional data communications port well known in the art. The GPS antenna connector 184 and external power connector 186 are also shown in FIG. 8.

Figure 9:
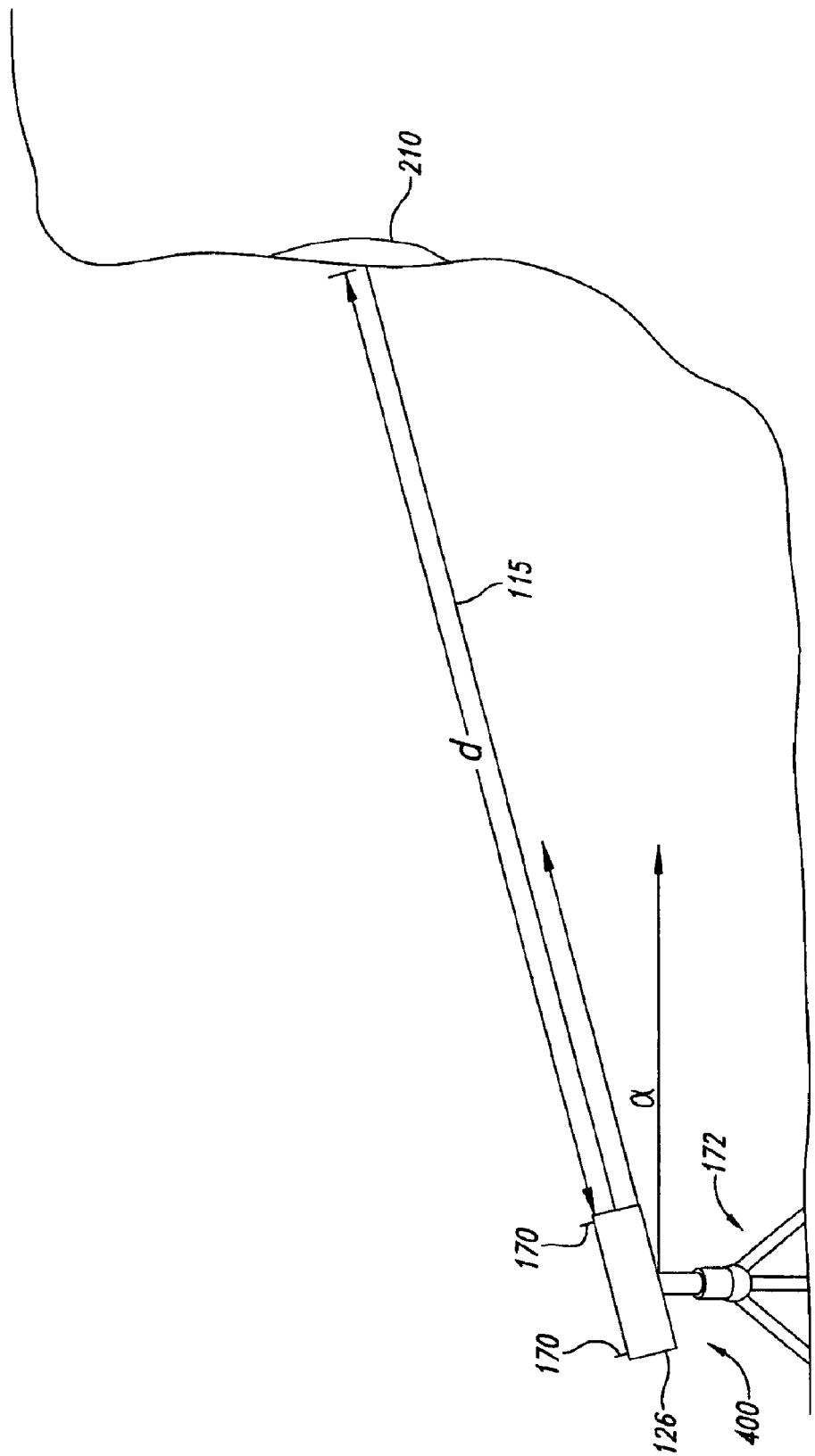
FIG. 9 is a right side elevation view illustrating the operation of the system of FIG. 1 in measuring a geologic area of interest.

The operation of the system 400 is illustrated in FIG. 9 where the system 400 is used to map an area 210 of interest. The area 210 may be a geological formation, such as a stratification layer in a cliff, a mineral deposit, or the like. The precise location of the system 400 is provided by the GPS receiver 104 (see FIG. 1). Given the precise location of the system 400, the various components of the integrated system permit a high degree of automation in mapping the area 210.

The operator updates their position by using the GPS, the coordinates of the system 400, as provided by the GPS receiver 104, are provided to the PC 102. The user then aims the system 400 at the area 210 using the visible laser 114 pointed at the selected target and activates the Laser On trigger 120. In response to the activation, the distance, indicated by the reference d in FIG. 9, is determined by the laser range finder 116. The orientation of the system 400 is determined by the compass 112 and the tilt meter 110 which measures pitch and roll. In the example illustrated in FIG. 9, the tiltmeter 110 measures an angle, indicated by the reference a in FIG. 9, measures the orientation of the housing with respect to the horizontal. The system 400 can calculate the height of the selected target (e.g., the area 210) above the present position of the system using conventional trigonometry.

Figure 10:
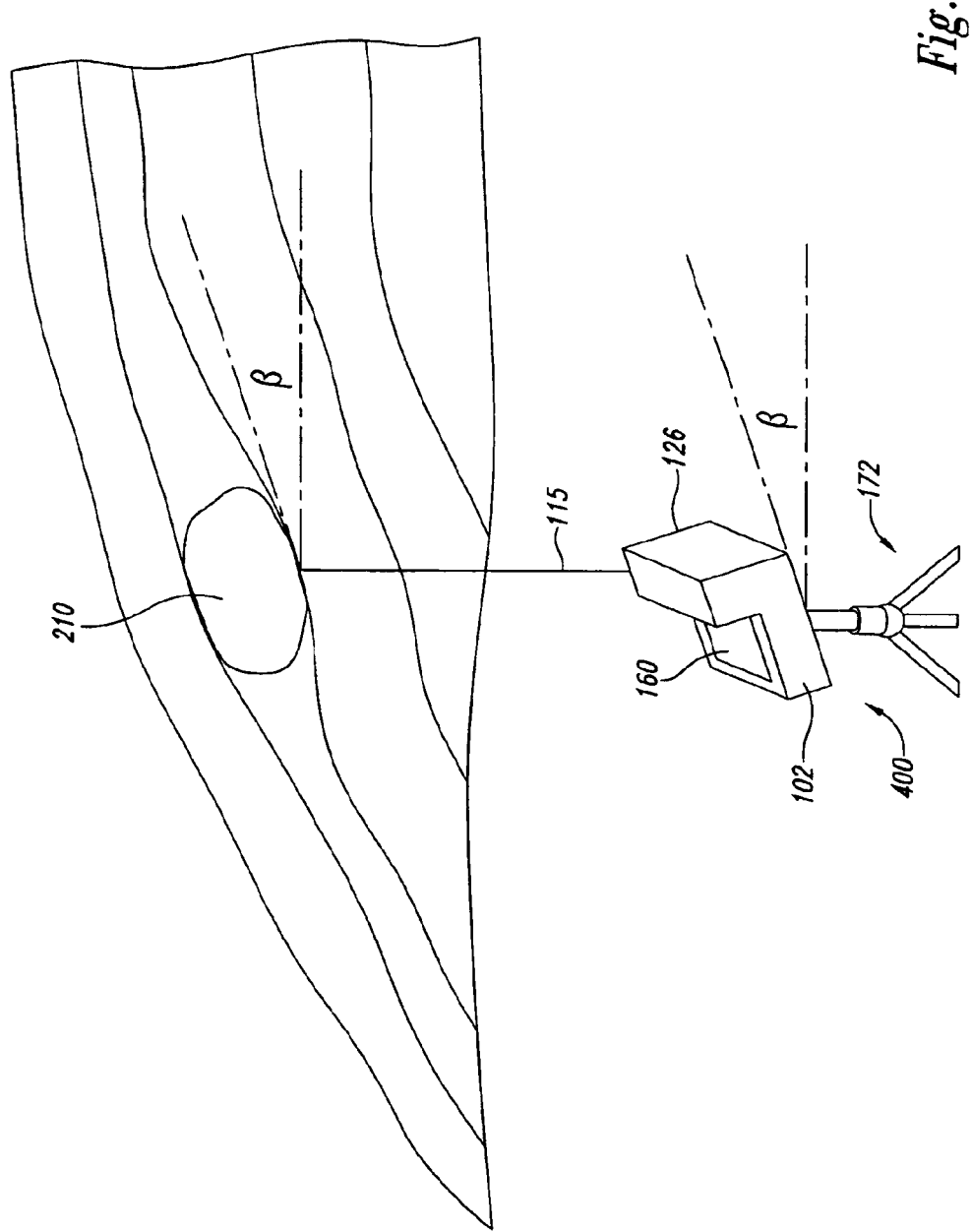
FIG. 10 is a back view of the measurement process illustrated in FIG. 9.

FIG. 10 is a rear view of the measurement process illustrated in the example of FIG. 9. The light beam 115 from the visible laser is projected onto a boundary of the area 210 and the trigger 120 (see FIG. 1) is activated. In one embodiment, the system 400 may be readjusted such that the light beam 115 shines on a different portion of the boundary of the area 210 and the trigger 120 activated a second time. This process may be repeated a number of times along the periphery of the area 210 in order to demarcate the boundaries of the area. In an alternative embodiment, the system 400 has an automatic mode in which the measurement processes are repeated periodically without the need for repeated activation of the trigger 120. In this mode, the visible laser 114 may be continuously activated so as to project the light beam 115 onto the area 210. The user simply moves the system 400 to trace the outline of the area 210 using the light beam 115. The system 400 performs cyclical (not necessarily periodic) measurements as the outline of the area is traced and the data are automatically entered into the PC 102. The rate at which measurements are automatically performed may be selected by the user. Thus, the system 400 offers great flexibility in operational modes to simplify the digital mapping process.

In another example of the measurement process, the system 400 may be placed on top of the geological formation illustrated in FIGS. 9–10. The system 400 is aimed along the top of the geologic formation to measure the strike and dip of the geologic formation. The term "strike and dip" is a term originally developed in mining. The term "strike" is used to indicate the horizontal direction or line of a vein of a mineral within a mine, while the term "dip" is used to refer to the angle below horizontal at which the vein projects from the measurement point. These terms have broader use in geologic measurements to indicate, by way of example, the tilt of the sedimentary bed, such as illustrated in FIG. 10. The strike is determined by the azimuth of the compass 112 and dip is determined by the roll ($\beta$) of the tilt meter 110 when the system 400 is aligned to be co-planar with the geological feature and the laser is aimed along the horizontal strike line. Alternatively, the Dip and Dip direction may be measured using the system 400.

In certain situations, the system 400 is not within line of sight of GPS satellites and the GPS receiver 104 (see FIG. 1) is unable to provide accurate position data. In such cases, it is possible to rely on existing survey data, such as United States Geological Service (USGS) or survey markers above or below the ground surface. In other settings, such as a mine, survey markers are provided at line of sight points throughout the mine. The system 400 may be positioned directly above or below a known marker and data from that marker entered as files or manually entered into the system 400 to provide accurate current position of the system. Alternatively, the system 400 can be positioned over a desired setup location and just aimed at a nearby survey marker. Using the laser, the set up point is calculated back from the known survey point using a distance and direction calculation. Thereafter, the system 400 may be used in the manner described above to generate additional data for automatic entry into the PC 102.

Figure 11:
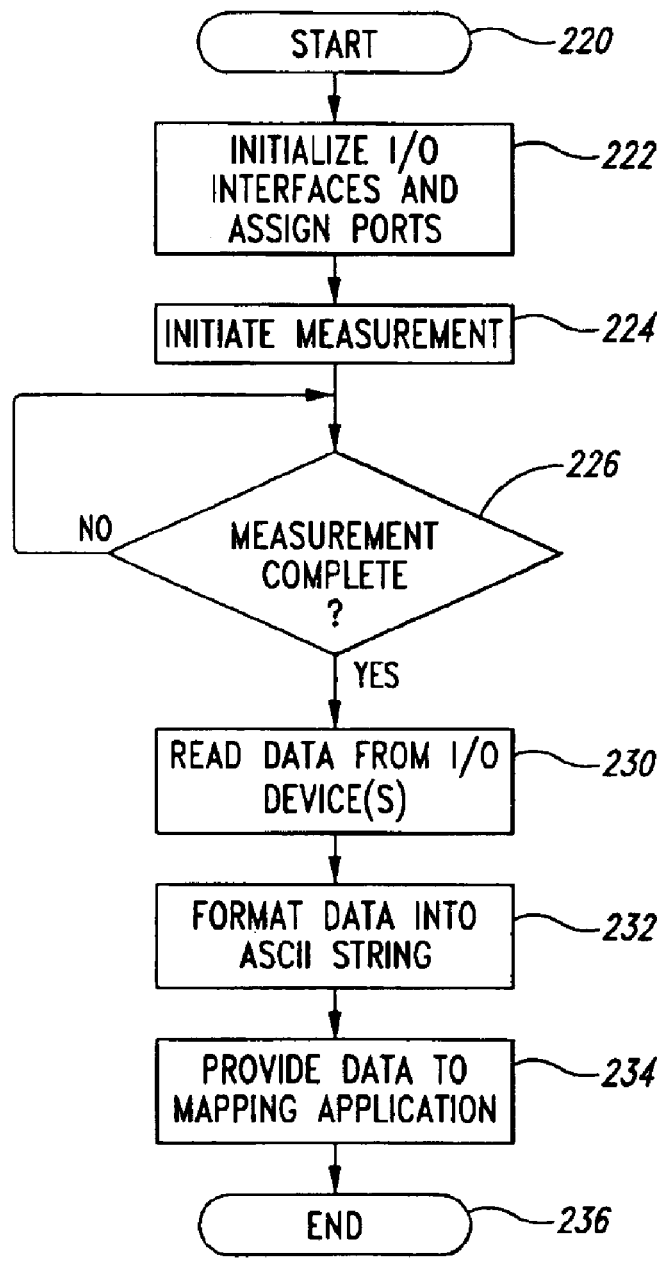
FIG. 11 is a flow chart illustrating the operation of the system FIG. 1 to perform a measurement cycle.

In a typical implementation, the various components described above have differing data formats. For example, the laser range finder 116 may provide serial data in a predetermined format. The PC 102 is programmed to initialize the I/O interfaces 164 (see FIG. 2) for proper operation with each of the integrated measurement components and to accept data therefrom. The PC 102 converts the data into an ASCII data string for use with the digital mapping software. FIG. 11 is a flow chart illustrating the operation of the system 400 to communicate with the measurement components. At a start 220, the system is positioned in the desired location and power is applied to the system 400. A step 222, the PC 102 initializes the I/O interfaces 164 (see FIG. 2) and assigns I/O ports to the various measurement components (e.g., the GPS receiver 104).

In step 224, the system 400 initiates a measurement cycle. As noted above, the measurement cycle may be initiated manually by the user activating the trigger 120, or may be periodically triggered automatically for repeated measurements.

In decision 226, the system 400 determines whether measurements are complete. Those skilled in the art can appreciate that some components, such as the tiltmeter 110 and the compass 112, may provide a continuous readout of the orientation of the system while other devices, such as the laser range finder 116, may need to perform a series of measurements to accurately determine the range d (see FIG. 9) to the area 210. If the measurement cycle is not complete, the result of decision 226 is NO and system returns to decision 226 to await the completion of the measurement cycle.

If the measurement cycle is complete, the result of decision 226 is YES and, in step 230, the PC 102 reads data from the I/O device(s). This includes range data from the laser range finder 116 and compass azimuth data from the compass 112 as well as the tilt angle measured by the tile meter 110.

In step 232, the PC 102 formats the data into an ASCII string and in step 234, the ASCII string data is provided to the mapping application program. The process ends at 236.

The example flow chart of FIG. 11 may have a number of variations that operate satisfactorily with the system. For example, some of the measurement components, such as the tiltmeter 110 and the compass 112, provide continuous data. In contrast, components such as the GPS receiver 104 and the laser range finder 116 may require a series of measurements that must be completed before they can generate meaningful data. The flowchart of FIG. 11 could be altered to allow data to be read from I/O devices, such as the tiltmeter 110 and the compass 112 immediately after the initiation of the measurement cycle at step 224 rather than await completion of the measurement cycle.

In yet another alternative, only certain measurements are performed in response to the initiation of the measurement cycle at step 224. For example, the system 400 may be set up at a desired location and a position measurement performed only a single time using the GPS receiver 104. Thereafter, any measurement from that same location need not include a repeat of the measurement cycle of the GPS receiver 104. Accordingly, the system 400 can be configured to provide a single position measurement when the system 400 is initially set up at the desired location. Thus, the flow chart of FIG. 11 need not repeat the measurement of position using the GPS receiver until the 4is moved to a new location.

From the foregoing it will be appreciated that, although specific embodiments of the invention have been described herein for purposes of illustration, various modifications may be made without deviating from the spirit and scope of the invention.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. An integrated digital mapping system comprising:
   a housing sized to be held in the hands of an individual;
   a portable computer contained within the housing and having a display visible from outside the housing;
   a tilt meter positioned within the housing and operably coupled to the computer, the tilt meter providing tilt data indicative of an angular tilt orientation of an object to be mapped;
   a compass positioned within the housing and operably coupled to the computer, the compass providing compass data indicative of a compass orientation of the housing when selectively activated;
   a laser positioned within the housing and operably coupled to the computer, the laser providing range data indicative of a range from the housing to a target when selectively activated;
   an aiming member fixedly coupled to the housing to permit aiming of the integrated system at the target; and
   a trigger coupled to the housing to initiate a measurement when activated, the trigger selectively activating the laser to provide range data to the computer and causing the tilt meter and compass to provide tilt data and compass data to the computer.

2. The system of claim 1, further comprising a global positioning system (GPS) receiver positioned within the housing and operably coupled to the computer, the GPS receiver configured to provide position information indicative of the position of the integrated system when selectively activated.

3. The system of claim 1 wherein the laser is a phase difference laser.

4. The system of claim 1 wherein the laser is a pulsed laser.

5. The system of claim 1 wherein the aiming member comprises a sight mounted on an external portion of the housing to permit aiming of the system at the target.

6. The system of claim 1 wherein the aiming member comprises an aiming laser contained within the housing and configured to generate a visible light when selectively activated in response to activation of the trigger to permit aiming of the system at the target.

7. The system of claim 1 wherein the tilt meter and the compass are integrated into a single unit, the integrated unit providing the tilt data and the compass data to the computer when selectively activated.

8. The system of claim 1 wherein the tilt meter provides a measure of the pitch and the roll of the housing.

9. The system of claim 1, further comprising a data conversion processor to convert the data received into a predetermined format.

10. The system of claim 8 wherein the predetermined format is ASCII string data.

11. The system of claim 1 wherein the trigger is configured for manual activation by a user.

12. The system of claim 1 wherein the trigger is automatically activated.

13. The system of claim 12 wherein the trigger is automatically activated at a predetermined rate.

14. A digital mapping method comprising: aiming a housing, containing measurement instruments, at a selected target;
   orienting the housing with the target;
   activating a trigger coupled to the housing to initiate a measurement;
   in response to the activation, measuring an angular tilt orientation of the target using a tilt meter positioned within the housing;
   in response to the activation, measuring a compass orientation of the housing using a compass positioned within the housing;
   in response to the activation, measuring a range from the housing to the target using a laser positioned within the housing; and
   providing range data related to the range, tilt data related to the tilt and compass data related to the compass orientation to a portable computer contained within the housing and having a display visible from outside the housing.

15. The method of claim 14, further comprising providing the range data, tilt data and compass data are to a mapping application program in the portable computer.

16. The method of claim 14, further comprising determining the position of the housing in response to the activation using a global positioning system (GPS) receiver positioned within the housing.

17. The method of claim 16, further comprising position data related to the determined position to a mapping application program in the portable computer.

18. The method of claim 14 wherein the aiming the housing comprises aiming a visible light at the selected target in response to the activation.

19. The method of claim 14 wherein the angular tilt orientation comprises the pitch and the roll of the housing.

20. The method of claim 14, further comprising converting the data received into a predetermined format for use with a mapping application program.

21. The method of claim 14 wherein activating the trigger comprises sensing manual activation by a user.

22. The method of claim 14 wherein activating the trigger comprises automatically activating the trigger.

* * * * *